(12) United States Patent  (10) Patent No.: US 7,545,082 B2
Nakajima  (45) Date of Patent: Jun. 9, 2009

(54) ULTRASONIC SENSOR DEVICE AND ULTRASONIC TRANSDUCER

(75) Inventor: Akira Nakajima, Okazaki (JP)

(73) Assignee: Denso Corporation, Kariya (JP)

( * ) Notice: Subject to any disclaimer, the term of this patent is extended or adjusted under 35 U.S.C. 154(b) by 299 days.

(21) Appl. No.: 11/447,902

(22) Filed: Jun. 7, 2006

(65) Prior Publication Data

US 2006/0284515 A1   Dec. 21, 2006

(30) Foreign Application Priority Data

Jun. 9, 2005   (JP) .............................. 2005-170002

(51) Int. Cl.
*H01L 41/08*   (2006.01)
(52) U.S. Cl. ...................... 310/334; 310/327
(58) Field of Classification Search .................. 310/322, 310/324, 334–338
See application file for complete search history.

(56) References Cited

U.S. PATENT DOCUMENTS

| | | | | |
|---|---|---|---|---|
| 2,917,642 | A | * | 12/1959 | Wright et al. ................ 310/338 |
| 3,461,327 | A | * | 8/1969 | Zeiringer ..................... 310/338 |
| 3,801,838 | A | * | 4/1974 | Kistler ......................... 310/338 |
| 4,190,784 | A | * | 2/1980 | Massa .......................... 310/324 |
| 4,519,254 | A | * | 5/1985 | Sonderegger et al. .......... 73/726 |
| 5,907,521 | A | | 5/1999 | Matsui et al. |
| 7,307,374 | B2 | * | 12/2007 | Ossmann ..................... 310/335 |
| 2004/0000838 | A1 | | 1/2004 | Toda |
| 2005/0043624 | A1 | | 2/2005 | Oliver |

2005/0236938 A1   10/2005  Nakajima

FOREIGN PATENT DOCUMENTS

| | | |
|---|---|---|
| DE | 2404943 A1 | 8/1975 |
| DE | 3939387 A1 | 6/1991 |
| DE | 19543137 A1 | 5/1997 |
| DE | 10039060 A1 | 3/2002 |
| EP | 0 881 624 B1 | 4/2003 |
| JP | 7-318647 | 12/1995 |

OTHER PUBLICATIONS

German Office Action dated Apr. 18, 2008 issued in corresponding German Application No. 10 2006 026 247.6-35 with English translation.
Canadian Official Action dated Feb. 28, 2008, issued in corresponding Canadian Application No. 2,549,704.
German Office Action dated Apr. 18, 2008 issued in correcsponding German Application No. 10 2006 026 247.6-35 with English translation.
Canadian Office Action dated Feb. 16, 2009, issued in counterpart Canadian Application No. 2,549,704.

* cited by examiner

*Primary Examiner*—Mark Budd
(74) *Attorney, Agent, or Firm*—Nixon & Vanderhye, PC

(57) ABSTRACT

An ultrasonic sensor device includes an ultrasonic transducer and a hollow case. The ultrasonic transducer includes a tubular housing having a bottom, a piezoelectric element and a vibrating surface. The piezoelectric element is fixed to an inner surface of the bottom of the tubular housing. The vibrating surface is an outer surface of the bottom of the tubular housing. The hollow case includes an opening surface, through which the hollow case receives the ultrasonic transducer such that the vibrating surface is externally exposed. The ultrasonic sensor limits an impact due to a collision by an object from being transmitted to the vibrating surface by use of a filter, which is located over the vibrating surface.

28 Claims, 5 Drawing Sheets

ULTRASONIC SENSOR DEVICE AND ULTRASONIC TRANSDUCER

CROSS REFERENCE TO RELATED APPLICATION

This application is based on and incorporates herein by reference Japanese Patent Application No. 2005-170002 filed on Jun. 9, 2005.

BACKGROUND OF THE INVENTION

1. Field of the Invention

The present invention relates to an ultrasonic sensor device and an ultrasonic transducer.

2. Description of Related Art

Conventionally, Japanese Unexamined Patent Publication No. 2003-32794 corresponding to EP No. 0881624B1 discloses that an ultrasonic sensor, which includes an ultrasonic transducer received in a hollow case. Here, the ultrasonic transducer includes a housing with a bottom, a piezoelectric element, which is fixed to an inner surface of the bottom. The bottom of the housing serves as a vibrating surface.

Generally, the thus ultrasonic sensor is assembled to, for example, a bumper of a vehicle so that the ultrasonic sensor serves as an obstacle sensor to detect obstacles around the vehicle.

In this case, the ultrasonic sensor is typically located at a position such that the vibrating surface of the ultrasonic transducer is exposed outside of the vehicle. Therefore, an object (e.g., a flying stone) may directly collide with the vibrating surface, thereby damaging the ultrasonic transducer.

SUMMARY OF THE INVENTION

The present invention is made in view of the above disadvantages. It is an objective of the present invention to provide an ultrasonic sensor and an ultrasonic transducer, which obviates or mitigates at least one of the above disadvantages.

To achieve the objective of the present invention, there is provided an ultrasonic sensor device, which includes an ultrasonic transducer, a hollow case and a limiting means. The ultrasonic transducer includes a tubular housing, a piezoelectric element and a vibrating surface. The tubular housing has a bottom. The piezoelectric element is fixed to an inner surface of the bottom of the tubular housing. The vibrating surface is an outer surface of the bottom of the tubular housing. The hollow case includes an opening surface, through which the hollow case receives the ultrasonic transducer such that the vibrating surface is externally exposed. The limiting means limits an impact due to a collision by an object from being transmitted to the vibrating surface, wherein the limiting means is located over the vibrating surface.

To achieve the objective of the present invention, there is also provided an ultrasonic transducer, which includes a tubular housing, a piezoelectric element, a vibrating surface and a shock-absorbing film. The tubular housing has a bottom. The piezoelectric element is fixed to an inner surface of the bottom of the tubular housing. The vibrating surface is an outer surface of the bottom of the tubular housing. The shock-absorbing film is located on a surface of the vibrating surface such that the shock-absorbing film limits an impact due to collision by an object from being transmitted to the vibrating surface.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

FIRST EMBODIMENT

Figure 1A:
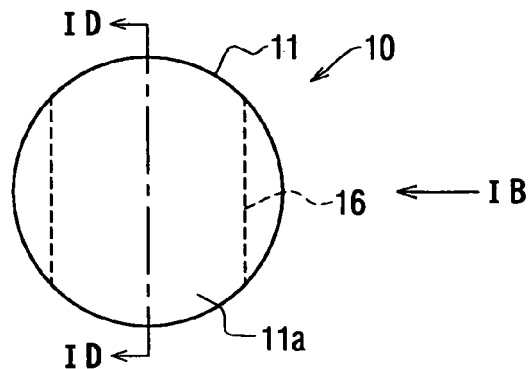
FIG. 1A is a front view showing a structure of the ultrasonic transducer of an ultrasonic sensor according to a first embodiment.
Figure 1B:
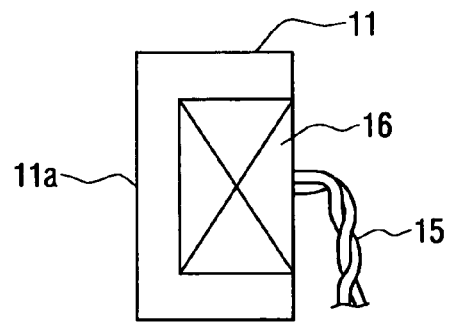
FIG. 1B is a right side view seen from a direction IB in FIG. 1A showing a structure of the ultrasonic transducer of the ultrasonic sensor according to the first embodiment.

An ultrasonic transducer 10 includes a tubular housing 11 with a bottom and a piezoelectric element 12, which is fixed to an inner surface of the bottom. The housing 11 is made of an electrically conductive material (e.g., a metallic material, an electrically insulated material coated with an electrically conductive film). The housing 11 has an interior space 13 inside. The piezoelectric element 12 is pasted to the inner surface of the bottom of the housing 11. An outer surface of the bottom serves as a vibrating surface 11a. In the present embodiment, aluminum serves as the electrically conductive material. Also, the vibrating surface 11a is formed into a circular shape.

The piezoelectric element 12 includes a piezoelectric ceramics (e.g., lead zirconate titanate ceramics), and two electrodes (not shown), each of which is provided to each side of the piezoelectric ceramics. The first electrode is pasted to the inner surface of the bottom of the housing 11 by use of, for example, an electrically conductive adhesive. One of lead wires 15 is soldered to one of the second electrode, and the other of the lead wires 15 is connected to the first electrode through the housing 11. In the present embodiment, the housing 11 includes a notch 14 on an inner peripheral surface of the housing 11. The other lead wire 15 is soldered to the notch 14. Thus, alternating voltage (alternating signal) can be applied to the piezoelectric element 12 through the housing 11 such that the piezoelectric element 12 is driven, and that the vibrating surface 11a is vibrated.

Figure 1C:
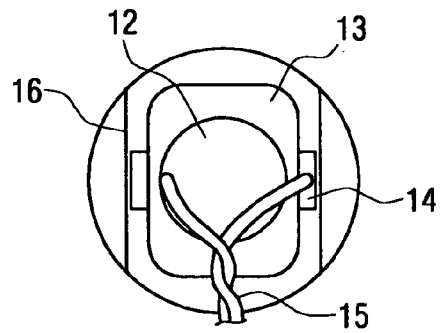
FIG. 1C is a back view showing a structure of the ultrasonic transducer of the ultrasonic sensor according to the first embodiment when a filling is removed.
Figure 1D:
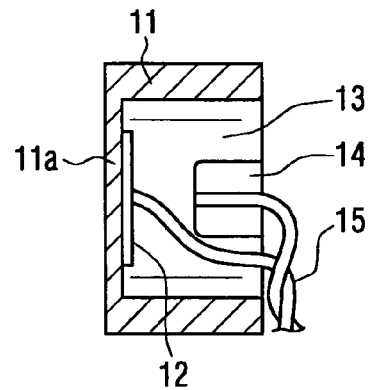
FIG. 1D is a schematic view taken along line ID-ID in FIG. 1A showing a structure of the ultrasonic transducer of the ultrasonic sensor according to the first embodiment when the filling is removed.

The interior space 13 is formed into a shape (rounded rectangle) such that a longitudinal distance and a traverse distance of the interior space 13 are different as shown in FIG. 1C. The thus formed interior space 13 allows different directivities of the ultrasonic transducer 10 in the horizontal and vertical directions. Here, the directivity (angular range) in the vertical direction (an up-down direction in FIGS. 1A to 1D) is narrower than the directivity in the horizontal direction (a transverse direction in FIGS. 1A to 1D).

Here, the interior space 13 of the housing 11 is filled with a filling (e.g., a silicone), which is not shown, after the soldering of the lead wires 15 is completed. Also, the housing 11 includes a plane portion 16, a surface of which is flat, on each side of the housing 11. Because of the plane portions 16, it is recognized that the up-down direction in FIGS. 1A to 1D indicates the vertical-direction directivity, and that the traverse direction in FIGS. 1A to 1D indicates the horizontal-direction directivity.

Figure 2A:
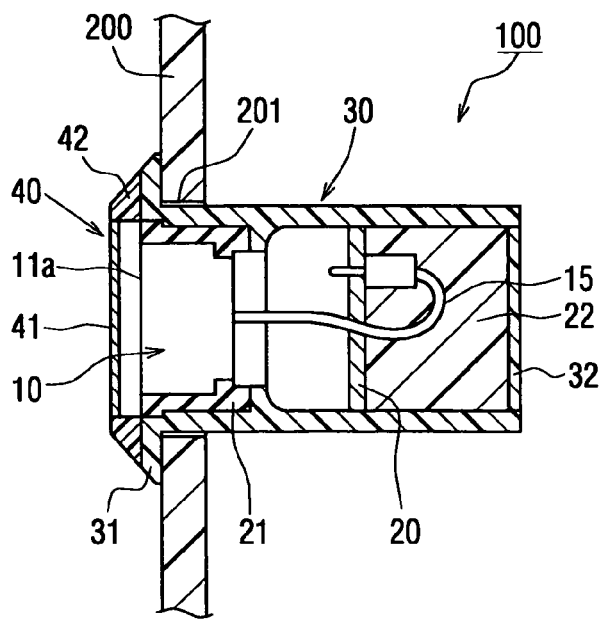
FIG. 2A is a sectional view showing the ultrasonic sensor having the ultrasonic transducer shown in FIG. 1 when the ultrasonic sensor is assembled to a bumper of a vehicle.
Figure 2B:
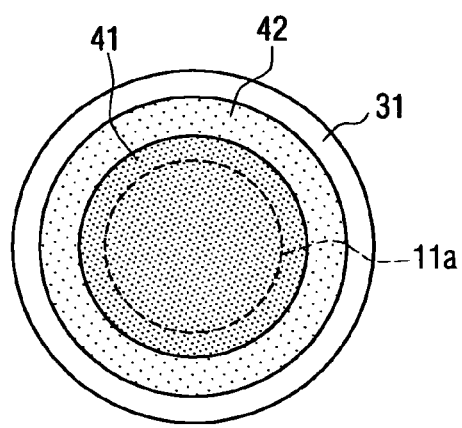
FIG. 2B is a front view showing the ultrasonic sensor having the ultrasonic transducer shown in FIG. 1 when the ultrasonic sensor is assembled to the bumper of the vehicle.

FIGS. 2A and 2B show a view, where an ultrasonic sensor having the ultrasonic transducer 10 shown in FIGS. 1A to 1D is assembled to a bumper of a vehicle. In FIG. 2A, in order to simplify the view, electronic components, which constitute a process circuit substrate, are not shown.

The ultrasonic sensor 100 includes the ultrasonic transducer 10 and the process circuit substrate 20 assembled in a hollow case 30, which is made of a synthetic resin. Here, the process circuit substrate 20 applies a drive voltage to the ultrasonic transducer 10 for generating an ultrasonic wave. Also, the process circuit substrate 20 processes a voltage, which is generated from the ultrasonic transducer 10 due to a back electromotive force.

The hollow case 30 is made of a synthetic resin, for example, polybutylene terephthalate (PBT). The hollow case 30 internally includes a vibration-limiting member 21, which is located at a periphery of the ultrasonic transducer 10. The vibration-limiting member 21 limits a vibration transmission from the ultrasonic transducer 10 to the case 30. In the present embodiment, the vibration-limiting member 21 is a tubular elastic body made of a silicone rubber. Also, a backside of the process circuit substrate 20 is filled with a moisture-proof silicone 22 for limiting the moisture. The process circuit substrate 20 is connected with a controller (not shown) through a connector (not shown) so that the controller detects obstacles located around a fore and aft of the vehicle or on corners of the vehicle body.

The case 30 includes an annular flange 31, which is locked on an external surface of a bumper (base member) 200 at a periphery of a through hole (penetrating hole) 201 located on the bumper 200. In other words, the ultrasonic sensor 100 of the present embodiment is inserted into the through hole 201 from outside of the bumper 200. Then, the flange 31 is locked on the external surface of the bumper 200 at the periphery of the through hole 201 such that the ultrasonic sensor 100 is fixed to the bumper 200. The ultrasonic transducer 10 and the vibration-limiting member 21 are inserted into the case 30 through a circular opening portion of the flange 31. With this assembling structure, the vibrating surface 11a of the ultrasonic transducer 10 is externally exposed through an opening surface of the case 30. In the present embodiment, an external surface of the flange 31 of the case 30 is located to be generally flash with the vibrating surface 11a of the ultrasonic transducer 10. Also, outer peripheral shapes of the flange 31 and the vibrating surface 11a are concentrically arranged about a common center.

Here, in the case 30, the lead wires 15 of the ultrasonic transducer 10 are electrically connected with the process circuit substrate 20. The process circuit substrate 20 includes a variable resistor (not shown) for adjusting a sensibility of the sensor. A resistance value of the variable resistor is manually adjustable by rotating a predetermined volume knob. The adjustment of the sensitivity of the sensor is performed as follows. Firstly, a test pole (obstacle) is provided at a position, which is a predetermined distance away from the ultrasonic transducer 10. The variable resistor is adjusted based on an output signal supplied from the process circuit substrate 20, which outputs the output signal in relation to the pole. When the adjustment is completed, the process circuit substrate 20 is inserted into the case 30 from a backside (opposite side) of the case 30 toward the flange 31. The backside (opposite side) is opposite from the flange 31 side of the case 30. When the process circuit substrate 20 is set at a predetermined position, the moisture-proof silicone 22 is supplied to fill the backside of the case 30. Then, a back opening of the case 30 is covered with a cover 32.

The ultrasonic sensor 100 of the present invention further includes a filter 40, which serves as a limiting means for limiting or preventing an impact due to a collision by an object, such as a flying stone, from being transmitted to the vibrating surface 11a.

The filter 40 is provided such that there is a clearance between the filter 40 and the vibrating surface 11a, and the filter 40 covers the vibrating surface 11a. Specifically, the filter 40 includes a perforated member 41 and a fixing member 42, both of which face with the vibrating surface 11a. The perforated member 41 has multiple through holes, which extend through the perforated member 41 perpendicularly (vertically) to the vibrating surface 11a. The fixing member 42 is provided to a periphery of the perforated member 41, and is fixed to the flange 31 of the case 30.

The perforated member 41 is formed into a mesh, and is located at a position, which is a predetermined distance away from the vibrating surface 11a. A material to form the perforated member 41 is not limited. Any material (e.g., a metallic material, a resin material, a fibrous material) can be applied to the perforated member 41 as long as the material can form a mesh structure. The perforated member 41 of the present embodiment is made of the metallic material. Also, a shape of the perforated member 41 is similar to the vibrating surface 11a as shown in FIG. 2B, and a size of the perforated member 41 is larger than that of the vibrating surface 11a. A degree of an opening (i.e., an area of opening portions per unit area of the perforated member 41) and a thickness of the perforated member 41 are determined to satisfy the following two conditions. The first condition is that the perforated member 41 needs to be strong enough to be durable against the impact due to the collision by the object, such as the flying stone so that the perforated member 41 keeps the object. The second condition is that the perforated member 41 can reliably emit and receive the ultrasonic wave through the through holes.

The fixing member 42 determines a position of the filter 40, and is adhered (fixed) to an external surface of the flange 31 of the case 30 such that the perforated member 41 covers a whole surface of the vibrating surface 11*a* at the same time of that the perforated member 41 is located away from the vibrating surface 11*a* by the predetermined distance. The fixing member 42 of the present embodiment is made of the PBT similarly to the case 30. The fixing member 42 is tapered radially outwardly in accordance with a tapered portion of the flange 31 as shown in FIG. 2. Also, the fixing member 42 is formed into an annular shape when it is seen from a position of the filter 40.

In the present embodiment, the ultrasonic sensor 100 is inserted into the through hole 201 from outside of the bumper 200. The flange 31 is fixed to the external surface of the bumper at a periphery of the through hole 201. In this way, the ultrasonic sensor 100 is fixed to the bumper 200. Therefore, the filter 40 can be fixed to the case 30 when the ultrasonic transducer 10 and the vibration-limiting member 21 have been assembled inside the case 30. Also, the perforated member 41 is integrated with the fixing member 42 by use of insert molding. However, this is not limited to the insert molding. An alternative method, such as fitting, screw bonding, adherence, welding, can be applied.

Thus, in the ultrasonic sensor 100 of the present embodiment, the filter 40 can limit the object, such as the flying stone, from colliding with the vibrating surface 11*a*. Also, the filter 40 is provided such that there is the clearance between the filter 40 and the vibrating surface 11*a*. Thus, the impact to the filter 40 is not directly transmitted to the vibrating surface 11*a*. Therefore, the impact due to the collision can be reduced or limited. Also, the vibrating surface 11*a* can effectively emit and receive the ultrasonic wave through the perforated member 41.

Also, in the present embodiment, the impact to the filter 40 due to the collision by the object is transmitted to the case 30 through the fixing member 42. At this time, the impact is absorbed by the vibration-limiting member 21, which is located adjacently to the case 30. Therefore, the impact due to the collision by the flying stone, which is transmitted to the ultrasonic transducer 10 from the case 30, can be effectively reduced. Similarly, transmission (travel) of the vibration supplied by the ultrasonic transducer 10 to the case 30 can be effectively reduced. Therefore, the erroneous detection can be limited. Also, the vibration-limiting member 21 can reduce the transmission of the vibration supplied by the ultrasonic transducer 10 to the case 30. Similarly, the vibration-limiting member 21 can effectively reduce the transmission of the vibration supplied by the case 30 to the ultrasonic transducer 10. Thus, the erroneous detection due to reverberation can be limited.

Figure 3:
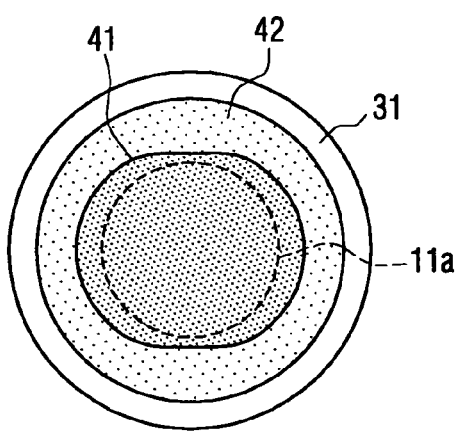
FIG. 3 is a plan view showing a modification of a perforated member.

The filter 40 is located over the vibrating surface 11*a*, thereby a detection area for detecting the ultrasonic wave may be reduced (i.e., a sensitivity of the ultrasonic sensor may deteriorate). This is because the filter 40 may hinder a part of the ultrasonic wave emitted by the vibrating surface 11*a*. Also, this is because the filter 40 may hinder the vibrating surface 11*a* from receiving a part of the ultrasonic wave that is reflected by the obstacle. However, in the present embodiment, the perforated member 41 is formed into a similar shape to the vibrating surface 11*a*, and the size of the perforated member 41 is equal to or larger than the vibrating surface 11*a*. Therefore, the detection area is limited from becoming reduced (i.e., the sensitivity of the ultrasonic sensor is limited from deteriorating). This is also good for design. Also, the ultrasonic sensor 100 of the present embodiment has the directivity. Thus, the shape and the size of the perforated member 41 may alternatively be changed based on the directivity of the ultrasonic transducer 10 at a position as shown in FIG. 3. Thereby, the detection area is limited from becoming reduced. FIG. 3 is a plan view showing a modification of the perforated member 41. In FIG. 3, although only the shape of the perforated member 41 is formed based on the directivity, the fixing member 42 may also be formed into the similar shape to the perforated member 41.

In the present embodiment, the perforated member 41 is formed into the mesh. However, the shape is not limited to this, as long as the perforated member 41 keeps the object, and the perforated member 41 can reliably emit and receive the ultrasonic wave through the through holes. For example, the perforated member 41 may alternatively have a honeycomb structure or a structure having multiple circular through holes. Here, a cross sectional area of the circular through hole is formed into a circular shape.

Figure 4:
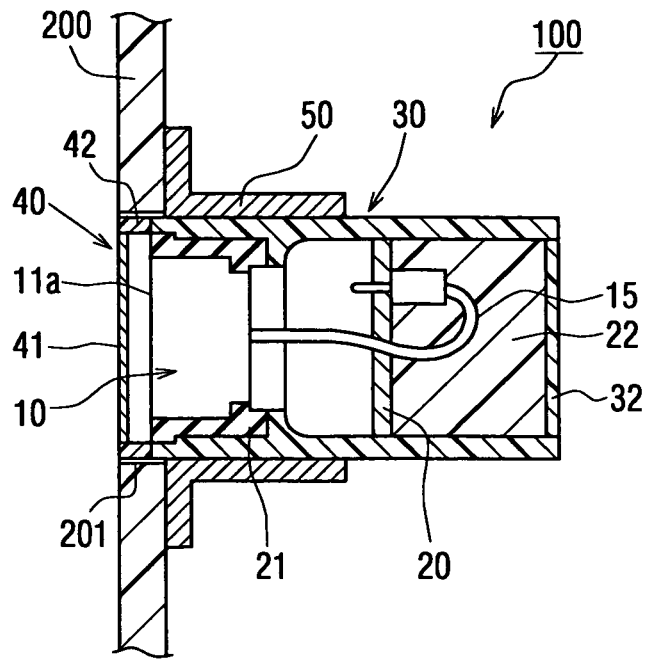
FIG. 4 is a sectional view showing an example of a modification of a filter.

Also, in the present embodiment, the filter 40 is located on the external surface of the bumper 200. However, for example, as shown in FIG. 4, the filter 40 may alternatively be located inside the through hole 201 when the ultrasonic sensor 100 can be fixed by use of a fixing means 50 that is fixed to the inner surface of the bumper 200 (e.g., through a fitting member, which is not shown). In this case, the filter 40 does not project from the outer surface of the bumper 200 so that the design can be improved. FIG. 4 is a sectional view showing a modification of the filter 40. In FIG. 4, the case 30 does not have the flange 31. Also, outer diameters of the case 30 and the fixing member 42 are equal to or slightly less than that of the through hole 201.

Figure 5:
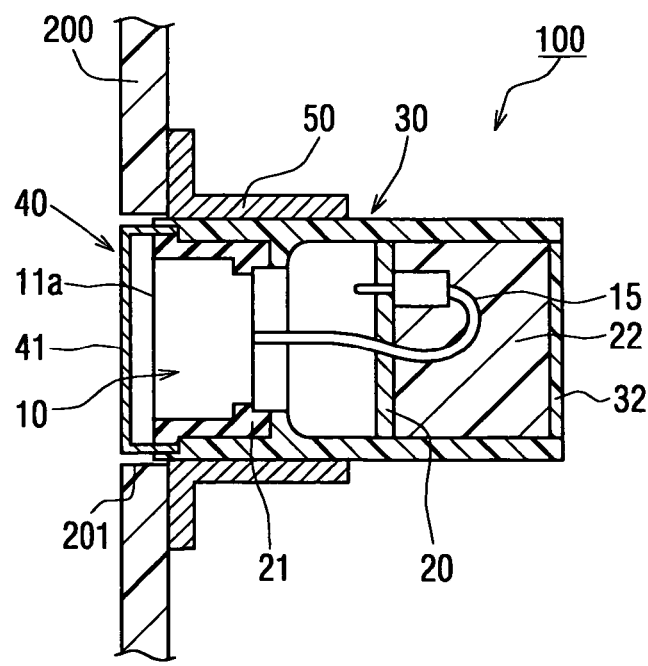
FIG. 5 is a sectional view showing another example of the modification of the filter.

Also, in the present embodiment, the filter 40 is adhered (fixed) to the case 30. However, the filter 40 may be alternatively fixed to the vibration-limiting member 21. In this case, the impact to the filter 40 due to the collision by the object can also be effectively reduced. Also, the filter 40 may be fixed to the vibration-limiting member 21 and the case 30. Also, a fixing method is not limited to the above examples. An alternative well known art, such as fitting, screw bonding, adherence, welding, can be applied. For example, as shown in FIG. 5, an end portion of the filter 40 is bent such that the bend portion thereof is fixed by being held between the vibration-limiting member 21 and the case 30. FIG. 5 is a sectional view showing another modification of the filter 40. In FIG. 5, the filter 40 includes solely the perforated member 41, which has metallic materials arranged as the mesh. Likewise, the filter 40 can include only the perforated member 41 (but the fixing member 42) when the material and the structure so allow.

Figure 6:
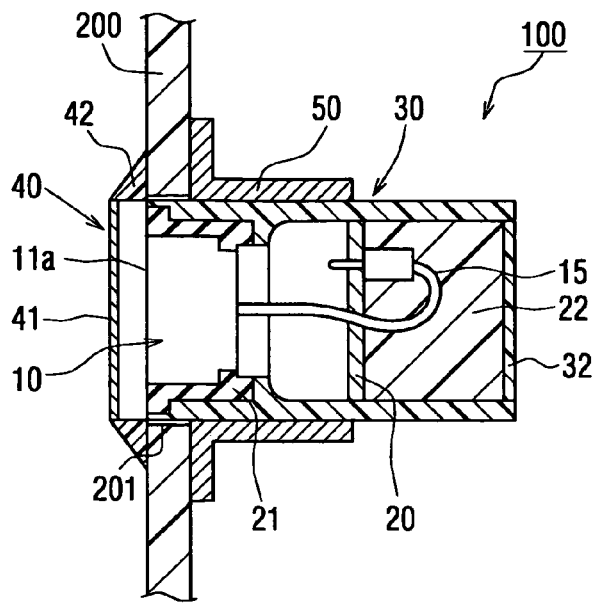
FIG. 6 is a sectional view showing another example of the modification of the filter.

The filter 40 may alternatively be fixed to a part other than the ultrasonic sensor 100. For example, as shown in FIG. 6, the fixing member 42 may be fixed to the outer surface of the bumper 200 at the periphery of the through hole 201 such that the perforated member 41 can be arranged with a clearance between the filter 40 and the vibrating surface 11*a*. FIG. 6 is a sectional view showing another modification of the filter 40.

Figure 7:
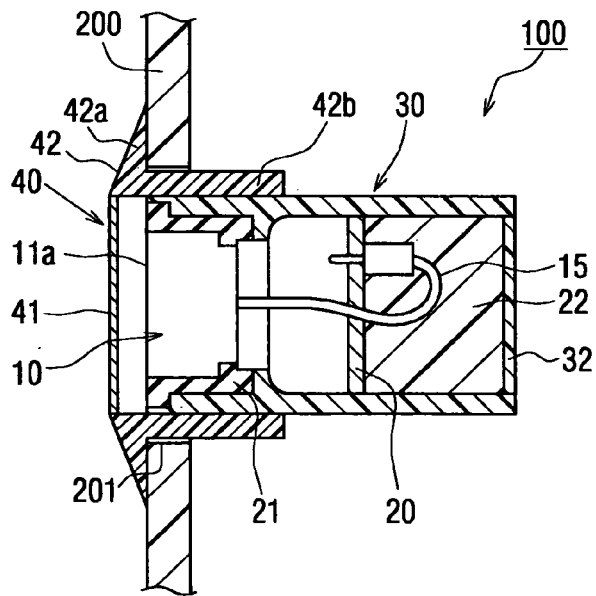
FIG. 7 is a sectional view showing another example of the modification of the filter.

In FIG. 6, the filter 40 and the fixing means 50 are separated from each other. However, as shown in FIG. 7, the fixing member 42 of the filter 40 may alternatively include a locking part 42*a* and a supporting part 42*b*. The locking part 42*a* is fixed to the outer surface of the bumper 200 at the periphery of the through hole 201. The supporting part 42*b* extends from the locking part 42*a* through the through hole 201 to project from the inner surface of the bumper 200. Also the supporting part 42*b* has a fixing member (not shown) and supports the ultrasonic sensor 100. As discussed above, the filter 40 may alternatively includes a function of the fixing means 50. FIG. 7 is a sectional view showing another modification of the filter 40.

The perforated member 41 may keep not only the flying stone but also a trash (i.e., a dust) as the object. Therefore, the sensitivity of the sensor may deteriorate when the object is captured in the perforated member 41. In order to deal with the deterioration of the sensitivity, dust in the perforated member 41 needs to be removed. Thus, the perforated member 41 may be removably attached to at least the fixing member 42. Also, the filter 40 may be removably attached. Due to this structure, the perforated member 41 can be washed or replaced effectively.

The sensitivity of the sensor may deteriorate because the filter 40 is located over the vibrating surface 11a. For the countermeasure for the above description, the ultrasonic sensor 100 of the present embodiment has a process circuit substrate 20, which is provided in the case 30. Thus, the sensitivity of the sensor can be adjusted by use of the process circuit substrate 20 while the filter 40 is located over the vibrating surface 11a. Thus, the sensitivity of the sensor is limited from deteriorating.

SECOND EMBODIMENT

The second embodiment will be described with reference to FIGS. 8 to 12. An ultrasonic transducer and an ultrasonic sensor in the second embodiment have common points to those in the first embodiment. Thus, explanation of the common points will be omitted and different points from the first embodiment will be mainly described.

The present embodiment is characterized by a shock-absorbing film for absorbing impact provided on the surface of the vibrating surface 11a. The shock-absorbing film serves as the limiting means for reducing or limiting the impact due to the collision by the object from being transmitted to the vibrating surface 11a.

Figure 8:
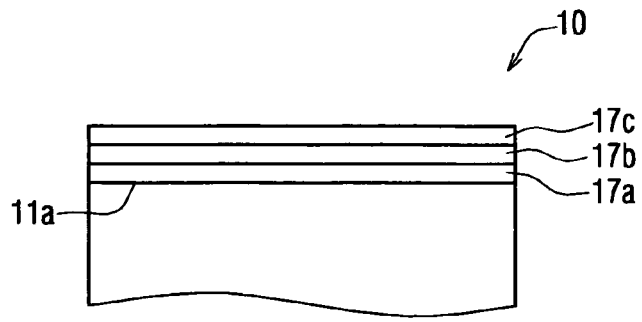
FIG. 8 is a schematic view of a conventional film structure, which coats a surface of the vibrating surface of an ultrasonic transducer, showing a comparison example according to a second embodiment.

The vibrating surface 11a of the ultrasonic transducer 10 included in the ultrasonic sensor 100 is located such that the vibrating surface 11a is exposed to, for example, the outside of the bumper 200. Therefore, the vibrating surface 11a is painted with the same color as the color of the bumper 200 in consideration of the design. FIG. 8 is a conventional film layer arrangement, which includes an electro-deposited film 17a, a color film 17b and a clear film 17c as shown in FIG. 8. The electro-deposited film 17a is made of an electrical conductive material, and is formed on the vibrating surface 11a. The color film 17b serves as an upper layer of the electro-deposited film 17a. The clear film 17c is formed as an upper layer of the color film 17b to protect and decorate the color film 17b. However, in the film layer arrangement, the ultrasonic transducer 10 may be disadvantageously broken because the film layer arrangement cannot effectively absorb the impact. Also, even in a case where the ultrasonic transducer 10 is not broken, the vibrating surface 11a may disadvantageously suffer from corrosion because the film may come off.

Figure 9:
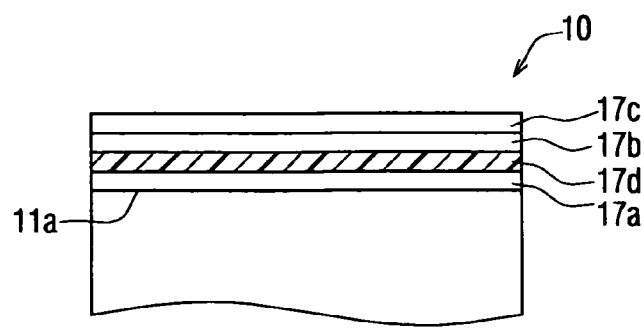
FIG. 9 is a schematic view of a film structure, which coats the vibrating surface of an ultrasonic transducer (the vibrating surface of an ultrasonic transducer of an ultrasonic sensor) according to the second embodiment.

Thus, in the present embodiment, the shock-absorbing film 17d is additionally provided to cover the whole surface of the vibrating surface 11a as shown in FIG. 9. Specifically, the shock-absorbing film 17d is made of a well-known shock absorbing coating compound (e.g., a matrix resin, such as an epoxy resin and a urethane resin, with flaky graphite being dispersed therein). Thereby, the ultrasonic transducer 10 is not broken by the collision of the object. Also, a thickness of the shock-absorbing film 17d is formed within a range as long as the sensitivity of the sensor is practically operable.

As described above, in the present embodiment, the transmission of the impact, which is caused by the collision of the object, to the vibrating surface 11a is reduced or is limited. Therefore, this limits the ultrasonic transducer 10 from being broken by the impact due to the collision by the object.

Also, the shock-absorbing film serving as the limiting means in the present embodiment takes a smaller space for its arrangement when compared with the filter 40 in the first embodiment. Thus, this is preferable in consideration of the design. When this limiting means in the second embodiment is applied to a conventional ultrasonic transducer structure, which includes a certain film over the vibrating surface 11a, a manufacturing process can be more simplified than a manufacturing process in the first embodiment, where the filter 40 is additionally provided.

Also, in the present embodiment, the shock-absorbing film 17d is provided as a lower layer of the color film 17b. In this film layer arrangement, the shock-absorbing film 17d is not limited to a specific color, thereby allowing the shock-absorbing film 17d to be applicable for the bumper of any color.

Figure 10:
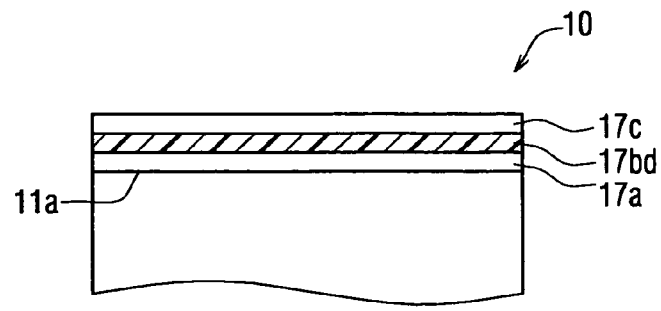
FIG. 10 is a schematic view of an example of a modification of a film structure.
Figure 11:
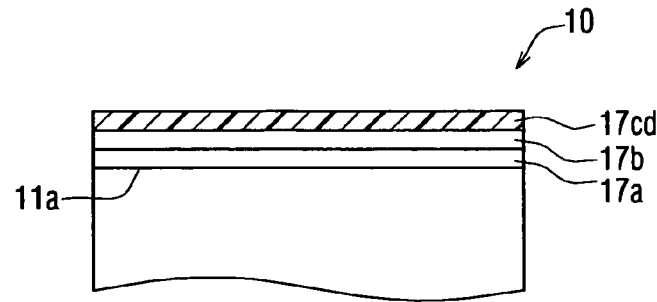
FIG. 11 is a schematic view of another example of the modification of the film structure.

In the present embodiment, the shock-absorbing film 17d is additionally provided to the vibrating surface 11a in addition to the conventional film layer arrangement of films 17a to 17c. However, at least one of the films 17a to 17c of the conventional film layer arrangement can alternatively serve as the shock-absorbing film. For example, as shown in FIG. 10, a shock-absorbing color film 17bd may alternatively replace the color film 17b. In this case, where the shock-absorbing film replaces the conventional film, a thickness of the film layer arrangement can be reduced. Therefore, this limits the deterioration of the sensitivity of the sensor, which deterioration may occur when the thickness of the film layer arrangement becomes larger. Also, as shown in FIG. 11, a shock-absorbing clear film 17cd may alternatively replace the clear film 17c. In this case, in addition to the above effect, the shock-absorbing clear film 17cd, which is transparent, can be applied to the bumper 200 of any color. Also, in the film layer arrangement shown in FIG. 9, the shock-absorbing film 17d may alternatively be located between the clear film 17c and the color film 17b. In this case, the shock-absorbing film 17d needs to be transparent.

In the present embodiment, the conventional film layer arrangement, which includes multiple films 17a to 17c, is shown as an example. However, the film layer arrangement is not limited above example. The vibrating surface 11a without any film layer arrangement may be alternatively applied, and at least one layer of the shock-absorbing film 17d can be additionally provided to the vibrating surface 11a.

Figure 12:
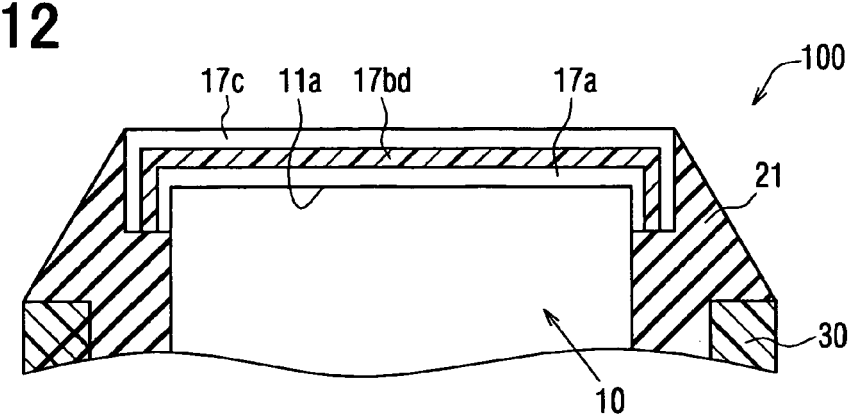
FIG. 12 is a schematic view of another example of the modification of the film structure.

Also, in the examples shown in FIGS. 9 to 11, the films are provided to solely the vibrating surface 11a (i.e., the films are provided to solely an end surface of the housing). However, for example as shown in FIG. 12, the film layer arrangement, which includes the electro-deposited film 17a, the shock-absorbing film 17bd and the clear film 17c, can be provided to cover a side surface of the housing 11 in addition to the vibrating surface 11a. Here, an end portion of the film layer arrangement located on the side surface is preferably located inside the vibration-limiting member 21. This structure is preferable in consideration of the design. Also, the film layer arrangement may become hard to come off in this structure because the end surfaces of the films of the film layer arrangement are not exposed. FIG. 12 shows a structure, where the end portion of the film layer arrangement 17a, 17bd, 17c is located inside the vibration-limiting member 21. However, the end portion of the film layer arrangement may be alternatively located inside the case 30 so that the similar effect may be achieved.

In the present embodiment, only one film 17d, 17bd, 17cd of the film layer arrangement serves as the shock-absorbing film. However, two or more films may also serve as the shock-absorbing film. For example, an alternative shock-absorbing film may include functions of both the color film 17b and the clear film 17c.

The sensitivity of the sensor may deteriorate because the thickness of the film layer arrangement becomes larger due to the shock-absorbing film 17d located above the vibrating surface 11a. Thus, in the present embodiment, the sensitivity of the sensor is preferably adjusted by use of the process circuit substrate 20 while the film layer arrangement of films 17a to 17d, which includes the shock-absorbing film 17d, is provided to the vibrating surface 11a. Thus, the sensitivity of the sensor is limited from deteriorating.

In the present embodiment, the bumper of the vehicle serves as the base member for supporting the ultrasonic sensor. However, the base member is not limited to this. Any part of a vehicle body can serve as the base member as long as the material and structure thereof is applicable. For example, a side door and a fender may alternatively serve as the base member.

The preferred embodiments have been described above. However, the present invention is not limited to the above embodiment and can be modified in various ways.

Additional advantages and modifications will readily occur to those skilled in the art. The invention in its broader terms is therefore not limited to the specific details, representative apparatus, and illustrative examples shown and described.

What is claimed is:

1. An ultrasonic sensor device comprising:
   an ultrasonic transducer that includes:
      a tubular housing having a bottom;
      a piezoelectric element that is fixed to an inner surface of the bottom of the tubular housing; and
      a vibrating surface that is an outer surface of the bottom of the tubular housing;
   a hollow case that includes an opening surface, through which the hollow case receives the ultrasonic transducer such that the vibrating surface is externally exposed;
   a limiting means for limiting an impact due to a collision by an object from being transmitted to the vibrating surface, wherein the limiting means is located over the vibrating surface; and
   a tubular vibration-limiting member that is located at a periphery of the ultrasonic transducer, wherein:
   the ultrasonic transducer is provided inside the hollow case through the tubular vibration-limiting member; and
   the tubular vibration-limiting member limits a vibration from traveling between the ultrasonic transducer and the hollow case.

2. The ultrasonic sensor device according to claim 1, wherein:
   the limiting means is a filter that is provided to cover the vibrating surface in such a manner that there is a clearance between the filter and the vibrating surface; and
   the filter includes a perforated member that faces the vibrating surface, the perforated member including a plurality of through holes that extend through the perforated member perpendicularly to the vibrating surface.

3. The ultrasonic sensor device according to claim 2, wherein:
   the perforated member is provided to cover a whole of the vibrating surface.

4. The ultrasonic sensor device according to claim 2, wherein:
   the filter is fixed to at least one of the hollow case and the tubular vibration-limiting member.

5. The ultrasonic sensor device according to claim 4, wherein:
   an end portion of the filter is bent such that the end portion of the filter is held between the tubular vibration-limiting member and the hollow case.

6. The ultrasonic sensor device according to claim 2, further comprising:
   a base member that includes a penetrating hole, through which the hollow case is provided in such a manner that the vibrating surface is externally exposed; and
   the filter is fixed to an outer surface of the base member at a periphery of the penetrating hole.

7. The ultrasonic sensor device according to claim 4, wherein:
   the filter includes the perforated member and a fixing member, which is provided to a periphery of the perforated member; and
   at least one part of the fixing member is fixed to other part.

8. The ultrasonic sensor device according to claim 6, wherein:
   the perforated member is removably provided to the fixing member.

9. The ultrasonic sensor device according to claim 2, wherein:
   the perforated member is formed into a mesh structure.

10. The ultrasonic sensor device according to claim 2, wherein:
    a size of the perforated member is equal to or larger than that of the vibrating surface.

11. The ultrasonic sensor device according to claim 2, wherein:
    the perforated member is formed into a corresponding shape and size in accordance with a directivity of the ultrasonic transducer when the perforated member is provided at a position.

12. The ultrasonic sensor device according to claim 1, wherein:
    a shock-absorbing film is provided to a surface of the vibrating surface as the limiting means; and
    the shock-absorbing film absorbs the impact.

13. The ultrasonic sensor device according to claim 12, wherein:
    the shock-absorbing film includes a coating compound that absorbs the impact.

14. The ultrasonic sensor device according to claim 12, further comprising:
    a film that is provided on the surface of the vibrating surface, wherein the film is different from the shock-absorbing film.

15. The ultrasonic sensor device according to claim 14, wherein:
    the shock-absorbing film is transparent.

16. The ultrasonic sensor device according to claim 12, further comprising:
    at least one film that is provided on the surface of the vibrating surface, wherein the at least one part of the at least one film serves as the shock-absorbing film.

17. The ultrasonic sensor device according to claim 16, wherein:
    the at least one film includes a plurality of layered films; and
    at least one of the plurality of layered films serves as the shock-absorbing film so that the at least one part of the at least one film serves as the shock-absorbing film.

18. The ultrasonic sensor device according to claim 17, wherein:
the shock-absorbing film is transparent.

19. The ultrasonic sensor device according to claim 16, wherein:
an end portion of each of the at least one film, at least one part of which serves as the shock-absorbing film, is provided to a side surface of the tubular housing; and
the end portion of each of the at least one film is located inside at least one of the hollow case and the tubular vibration-limiting member.

20. The ultrasonic sensor device according to claim 1, further comprising a process circuit substrate that is located in the hollow case for driving the ultrasonic transducer, wherein a sensitivity of the ultrasonic sensor device is adjusted by use of the process circuit substrate while the limiting means is located over the vibrating surface.

21. An ultrasonic transducer, comprising:
a tubular housing having a bottom;
a piezoelectric element that is fixed to an inner surface of the bottom of the tubular housing;
a vibrating surface that is an outer surface of the bottom of the tubular housing; and
a shock-absorbing film that is located on a surface of the vibrating surface such that the shock-absorbing film limits an impact due to collision by an object from being transmitted to the vibrating surface.

22. The ultrasonic transducer according to claim 21, wherein:
the shock-absorbing film includes a coating compound that absorbs the impact.

23. The ultrasonic transducer according to claim 21, further comprising:
a film that is located on the surface of the vibrating surface, wherein the film is different from the shock-absorbing film.

24. The ultrasonic transducer according to claim 23, wherein:
the shock-absorbing film is transparent.

25. The ultrasonic transducer according to claim 21, further comprising:
at least one film that is provided on the surface of the vibrating surface, wherein the at least one part of the at least one film serves as the shock-absorbing film.

26. The ultrasonic transducer according to claim 25, wherein the at least one film includes a plurality of layered films; and
at least one of the plurality of layered films serves as the shock-absorbing film so that the at least one part of the at least one film serves as the shock-absorbing film.

27. The ultrasonic transducer according to claim 25, wherein:
the shock-absorbing film is transparent.

28. The ultrasonic transducer according to claim 25, wherein:
an end portion of each of the at least one film, at least one part of which serves as the shock-absorbing film, is provided to a side surface of the tubular housing; and
the end portion of each of the at least one film is located inside at least one of the hollow case and the tubular vibration-limiting member.

* * * * *